May 8, 1945.   R. W. BROWN   2,375,343
RECOVERY OF ALUMINA
Filed May 18, 1942
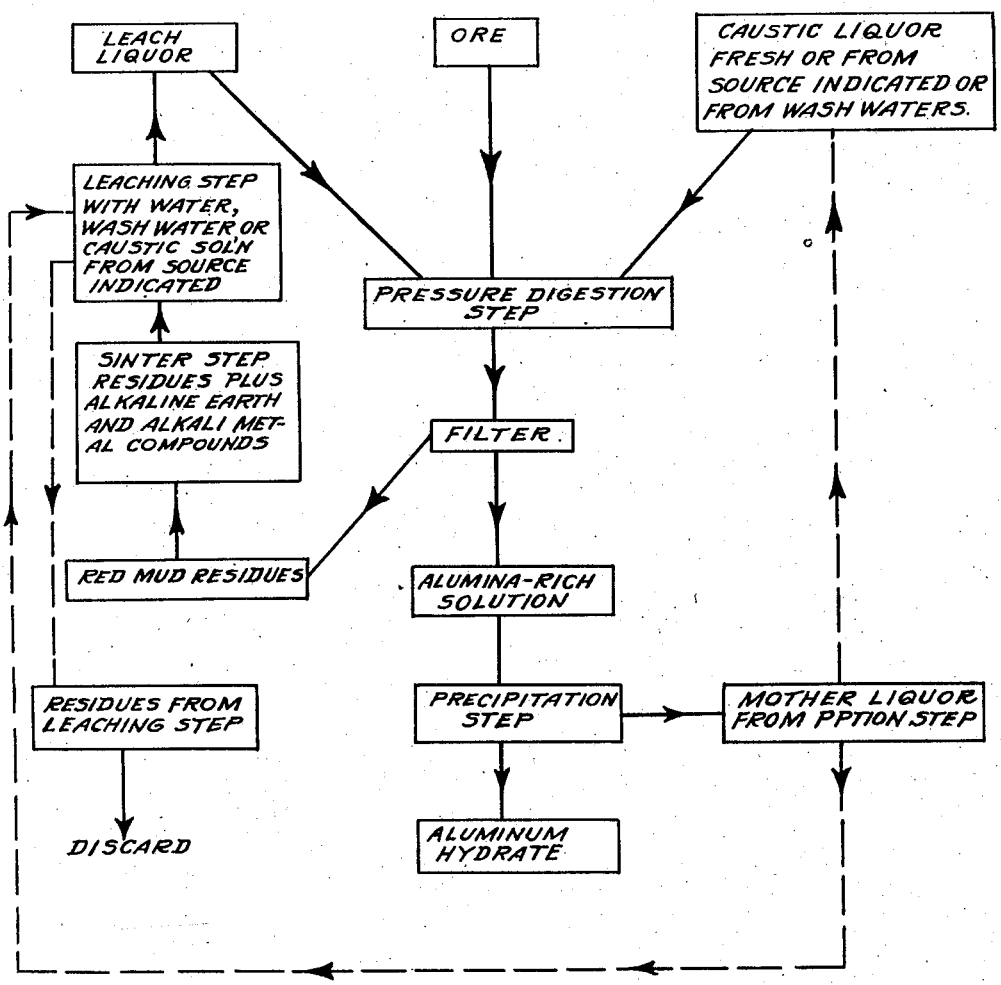
Inventor.
Ralph Waldo Brown.
By [signature] Attorney.

Patented May 8, 1945

2,375,343

UNITED STATES PATENT OFFICE 2,375,343

RECOVERY OF ALUMINA

Ralph Waldo Brown, East St. Louis, Ill., assignor to Aluminum Company of America, Pittsburgh, Pa., a corporation of Pennsylvania Application May 18, 1942, Serial No. 443,403

4 Claims. (Cl. 23—141)

This invention relates to methods of recovering from bauxite ores such as those containing large amounts of silica, an alumina product, substantially free from silica, which can be used in the production of aluminum of normal commercial purity.

The usual process of treating low-silica bauxite to recover the alumina values consists in digesting under pressure a slurry of bauxite and caustic liquor to form an alumina-rich solution, the separation of this solution from the undissolved portions of the bauxite, and the precipitation of alumina from the solution by the known methods of auto-precipitation. The spent solution or mother liquor resulting from this precipitation contains most of the caustic values originally introduced in the pressure digestion and is therefore returned to the pressure digestion step and used in the treatment of additional bauxite. The insoluble residues, commonly called "red mud," which result from the digestion step are treated as waste material and discarded. The simple cyclic operation of this process, which is often referred to as the Bayer process, allows maximum removal of alumina values from the bauxite ore used, without large loss of the caustic values originally introduced into the cycle to effect such removal. Every precaution is taken to minimize the amount of alumina and caustic values which might be included in the insoluble residues discarded from the digestion step and thereby lost. Such precautions must, however, be consistent with the production of alumina of a high purity and the alumina produced by this process is normally silica-free, i. e. contains less than about 0.06 per cent by weight of silica ($SiO_2$).

Alumina of this purity may also be produced by the above cyclic process from bauxite ores containing substantial quantities of silica, but as the silica content of the bauxite increases the cost of processing increases greatly because the silica, during the digestion step, forms an insoluble complex with a part of the alumina and caustic values. This insoluble complex, which may be a sodium aluminum silicate of the zeolite type, becomes a part of the insoluble residue and is discarded from the process. Usually this results in a loss of approximately one pound of soda (calculated as $Na_2CO_3$) and one pound of alumina (calculated as $Al_2O_3$) for every pound of silica in the digested slurry and thus the total effect is to substantially decrease the yield of alumina per ton of bauxite processed as well as to increase the amount of caustic lost in each operational cycle. For these reasons the Bayer-type process has been economically unsuccessful in the treatment of bauxite ores containing silica in amounts greater than about 6 or 7 per cent by weight.

There are large quantities of naturally occurring ores containing alumina values in the form of silicates and also substantial quantities of bauxite ores containing large amounts of silica, and several processes have been proposed for the extraction of alumina values from such ores. But such processes have not enjoyed commercial use either because of high cost or of high silica content of the alumina produced, or both. One such process is the "lime-soda" process, so-called because the finely ground ore is mixed with alkaline earth compound (such, for example, as limestone, lime or the like) and alkali metal compound (usually the relatively cheap soda ash) and sintered. The resulting sinter, in which much of the silica is insolubilized as alkaline earth silicate and much of the alumina values are solubilized as alkali metal aluminate, is leached with water, or an aqueous caustic solution, to remove the soluble values. The leach liquor thus obtained contains, however, not only the soluble and desirable sodium aluminate of the sinter but also an amount of unwanted silica which is found in the sinter in soluble form. In this process as originally proposed, the alumina is precipitated by treating the leach liquor with carbon dioxide, but the alumina thus precipitated contains the residual silica of the liquor, usually about 2 per cent or more by weight of the precipitated alumina. To reduce this high silica content in the final alumina product, Sherwin (U. S. Patent No. 1,422,004) proposed to autoclave the leach liquor with steam prior to precipitating alumina therefrom. This results in only partial elimination of the silica, the leach liquor thus treated usually containing sufficient of this impurity to produce a precipitated alumina containing 0.3 to 0.8 per cent by weight of silica. To further reduce the silica, Sherwin recommended that the alumina of the autoclave leach liquor be precipitated by seeding the liquor with freshly precipitated alumina followed by continual agitation. While this type of precipitation produces, as is well known, a silica-free alumina, only a portion of the alumina is precipitated and the balance of the solution still contains the residual soluble silica so that if the alumina is to be completely precipitated therefrom, as for instance by the carbon dioxide process of precipitation, so as to recover the alkali as carbonate for reuse, the precipitate may contain as high as 0.5 to 1.5 per cent by weight of silica. This and other modifications of the so-called lime-soda process have failed to commercially produce silica-free alumina from high-silica bauxite, and thus the high-silica bauxite deposits have lain substantially unused.

The purpose of the present invention is to provide a cyclic process of the type hitherto used to extract alumina from bauxite, but so modified by the adoption of certain principles of the unsuccessful lime-soda process that the total modified process will recover from high-silica bauxite a silica-free alumina at commercial cost. While the principles of the cyclic process of this invention and the invention as claimed herein might be useful in connection with hydrated alumina-bearing ores other than bauxite, the process is not adapted to the treatment of such clays and other naturally occurring silicates as contain more silica than alumina. Therefore, such ores are not included by the use of the word "bauxite."

In the preferred operation of the process, a slurry of bauxite, caustic liquor and leach liquor containing alumina and residual silica is pressure digested. The resultant alumina-rich solution is separated from the insoluble residues, the alumina is precipitated from the solution, and the remaining caustic mother liquor is returned to the digestion for the formation of additional slurry. The insoluble residues are sintered with proportional amounts of alkaline earth compound and alkali metal compound, the resultant sinter is leached to extract solubles therefrom, and the thus formed leach liquor is sent to the digestion step for the formation of additional slurry, whereby in the succeeding digestion the silica in the leach liquor is insolubilized and the alumina content of the leach liquor becomes available for precipitation from a low-silica alumina-rich solution.

As will appear from the following detailed description, it is possible by this improved cyclic process to recover most of the alumina values, as silica-free alumina, from bauxite ore of the type hitherto unused because of its high silica content, and this result is obtained without materially greater loss of caustic values per ton of alumina recovered than in the treatment of low-silica bauxite.

The first step consists in digesting a slurry composed of high-silica bauxite, caustic liquor and leach liquor from the sintering step, in an autoclave, usually at steam pressure of 60 to 200 pounds per square inch. Preparatory to this operation, the bauxite, as mined or after a preliminary drying operation, is crushed to suitable size. A size passing a ten mesh screen is satisfactory. The caustic liquor used contains the solvent, usually sodium hydroxide, for the alumina values in the bauxite. Because this caustic liquor is formed, at least in part, of the mother liquor from which silica-free alumina is precipitated (as hereinafter described), it may also contain residual unprecipitated alumina values which are, of course, recovered in the succeeding cycles of the process. The leach liquor is primarily an alkali aluminate solution (usually sodium aluminate) and may also, as is hereinafter described, contain some free caustic values. As a result of the digestion, the alumina content of the bauxite is dissolved by the caustic liquor to form an alumina-rich solution; the impurities of the bauxite, such as iron, titanium and other insolubles and perhaps some of the alumina remain undissolved and the most of the silica present in the bauxite, as well as the residual silica brought to the slurry in the leach liquor, forms an insoluble complex with approximately equal quantities of soda values (calculated as $Na_2CO_3$) and alumina values (calculated as $Al_2O_3$). Prior to digestion, the proportions of free caustic and bauxite are so adjusted that, after allowing for the insolubilization of caustic and alumina values by the silica content of the slurry and for the solution of the alumina of the bauxite, the ratio of alumina to caustic in the alumina-rich solution produced on digestion will be suitable for the subsequent handling of the solution and the precipitation of alumina by the known auto-precipitation processes. When the caustic is present as sodium hydroxide, the desired ratio, expressed as $Al_2O_3$ divided by the total $NaOH$ present (including that combined with the alumina), is from about 0.8 to about 1.

After digestion the slurry is separated, by filtering, sedimentation or similar processes, from the insoluble residues. These residues, having been washed, if desired, to remove entrained values, are then sent to the sintering operation. The alumina-rich solution produced by the digestion is sent to the auto-precipitation step. This alumina-rich solution is now low enough in silica so that the alumina precipitated therefrom will be silica-free, usually containing somewhat less than about 0.06 per cent by weight of silica. Precipitation is accomplished by the usual and well-known methods of seeding and agitation such as those described by Bayer (U. S. Patent No. 382,505), Sherwin (U. S. Patent No. 1,251,296), and Fickes (U. S. Reissue Patent No. 13,668). The precipitate is washed to remove residual caustic values. The mother liquor, composed of most of the caustic values and the unprecipitated alumina values is returned, at least in part, to the digestion step where it furnishes caustic liquor necessary to the digestion of the next batch of bauxite and returns its residual alumina values to the process. A portion of the mother liquor may be used to leach the sinter as hereinafter described. Wherever used the mother liquor may be diluted by the alkaline wash waters resulting from the washing operations above mentioned, thus also returning the caustic values in these waters to the process. If, as is usual when caustic liquors are handled and exposed to the carbon dioxide of the air, a portion of the caustic of the mother liquor becomes carbonated, the carbonate may be crystallized out by evaporation and thereafter used in the sintering process as a source of alkali metal compound or, alternatively, lime may be added to the digest slurry to causticize this carbonate, in which case the resulting calcium carbonate passes with the insoluble residue from the digestion to the sintering step, where, as will appear, it obviates, to the extent of its occurrence, the addition of alkaline earth compound to the process at that point.

The second step of the process is directed to the recovery of the caustic and alumina values insolubilized by the silica of the slurry during the digest and thus present in the insoluble residues remaining after the digest. To this end, the insoluble residues are mixed with proportioned amounts of alkaline earth compound and alkali metal compound and sintered. The amount of alkaline earth compound to be added will depend upon the amount of silica present in the residue and will also take into account any available amount of alkaline earth already present in the residue, such as that resulting from the causticization of the carbonate values during digestion such as above described. The total amount of alkaline earth compound present in any event should be at least sufficient to form with the silica an insoluble alkaline earth silicate. For instance, if limestone or lime is the alkaline earth material added, the amount present should preferably be somewhat in excess of that necessary to the formation of the insoluble dicalcium silicate ($2CaO.SiO_2$). If desired, the sinter mass may also contain quantities of alumina-bearing insoluble residues which, having been discarded from the older processes, are on hand as a waste material or it may contain quantities of other alumina-bearing ores.

The amount of alkali metal compound, preferably soda ash or some other cheap source of alkali metal, to be added to the mass prior to sintering, should be sufficient to furnish, during the sintering operation, an excess of available alkali metal in the mass over that necessary to form aluminates with all of the alumina of the residue. Since the caustic values insolubilized by silica during the digest step, and thus present in the residue, furnish approximately enough alkali metal to form aluminate with the alumina which was similarly insolubilized, it is usually necessary to add only sufficient alkali metal compound to make up that amount which may remain in insoluble form after the sintering and subsequent leaching operation. This usually amounts to about 25 to 40 per cent of the total caustic values of the digest residue. The addition of this amount will usually provide the excess desirable during the sintering operation. Of course additional quantities of alkali metal compound or of alkaline earth compound over the amounts above indicated may be added, but when they exceed the amount necessary to the operation, the result obtained may not justify the cost of the increased addition.

The sintering operation consists in heating this proportioned mass of residue, alkaline earth compound and alkali metal compound to temperatures which will frit or sinter the particles of the mass together preferably without causing melting to an extent which would interfere with subsequent leaching operations. The result of this heating is the formation of insoluble alkaline earth silicate with the consequent release of the caustic and alumina values originally combined with and insolubilized by the silica during the digestion process. These released caustic and alumina values are therefore available, as are the caustic values of the added alkali metal compound, to form soluble aluminates and to form alkali metal compounds, such as ferrites and titanates, with impurities such as iron and titanium which occur in the bauxite and are found in the insoluble residues. The separation thus effected between the silica and the alumina and caustic values is completed by the leaching operation.

In the leaching operation, the sinter resulting from the sintering operation is treated to dissolve the soluble values therefrom. This will result in the recovery from the sinter of much of the alumina values and such of the caustic values as do not remain insolubilized (usually about 60 to 75 per cent of the original caustic values of the residue, plus the caustic values of the alkali metal compound added prior to sintering). However, the leaching will also result in the extraction of certain amounts of silica which in usual operations may represent as much as 2 per cent or more by weight of the soluble alumina values. During the leaching such ferrites or titanates as may have formed during the sintering process may hydrolyze and a part or all of the alkali metal present therein will be recovered as caustic values. The leaching medium may be water, but it may be advantageous to use instead a solution containing caustic values, such as, for instance, a portion of the mother liquor from the precipitation step or the wash waters which have been used to remove residual caustic values from the precipitated alumina or subsequently from the leached sinter. The use of such mother liquor or wash waters has the advantage of returning to the process the caustic values contained therein as well as furnishing in the final leach liquor the excess of caustic usually required to stabilize the aluminate solution during leaching, separation from the leached mass and subsequent handling. It is desirable, as is well known, that soluble aluminate solutions contain an excess of caustic in order to promote stability and to prevent premature precipitation of alumina values. The insoluble leached sinter is washed to remove residual values and discarded from the process. As discarded, it contains little alumina, some of the caustic values, and most of the iron, titanium and similar impurities, but it consists principally of the insoluble alkaline earth silicate formed during the sintering operation. The leach liquor is sent to the digestion step where it is combined in the digestion slurry with fresh bauxite and with caustic liquor, preferably the mother liquor from the alumina precipitation step.

In leaching the sintered product, the leaching solution is preferably heated in order to hasten the leaching process. Preferably it is not heated much above 200° F. because at higher temperatures there is a tendency for the silica present to form insoluble complexes with caustic and alumina values and to this precipitate these values at this point. This is undesirable because the silica which is not insolubilized by the sintering process as an alkaline earth silicate, should be carried, according to the principles of this invention, by the leach liquor to the pressure digestion before being allowed to combine in insoluble form with caustic and alumina values. This insures the recovery of most of the thus insolubilized caustic and alumina values in the subsequent sintering operation, whereas if such values are insolubilized during the leaching operation, they would be discarded from the process with insoluble portions of the sinter and thus lost.

Using the process above described it is possible to commercially extract from high-silica bauxite about 85 to 90 per cent of the alumina contained therein, and this favorably compares with the 80 to 85 per cent extraction which is accomplished by the older cyclic processes for the treatment of low-silica bauxite. When high-silica bauxites were treated by the old cyclic process, the amount of alumina recovered was as low as 70 per cent or less.

The accompanying drawing is a flow sheet illustrative of the process.

What I claim is:

1. A cyclic process of extracting silica-free alumina from bauxite including pressure digestion of bauxite with caustic liquor and with an alkali metal aluminate solution containing soluble silica, separation of the alumina-rich solution thus formed from insoluble residues, sintering of the insoluble residues with proportioned quantities of alkaline earth compound and alkali metal compound, leaching of the resultant sinter to extract therefrom soluble values thus forming an alkali metal aluminate solution containing soluble silica and return of the said solution to the pressure digestion.

2. In a cyclic process of extracting silica-free alumina from bauxite, in combination, a digestion step in which bauxite and caustic liquor are pressure digested to form an alumina-rich solution and an insoluble residue including substantial values of caustic and alumina insolubilized by silica during digestion, a precipitation step in which alumina is precipitated from the alumina-rich solution and is separated from the mother liquor, a sintering step in which the said insoluble residue is sintered with amounts of alkaline earth compound and alkali metal compound proportioned to solubilize caustic and alumina values contained therein and a leaching step in which the sinter is treated to form a leach liquor containing the soluble values of said sinter, the insoluble portion of the sinter being discarded from the process and the leach liquor being returned to the digestion step and included therein.

3. The process described in claim 2 characterized by the fact that mother liquor resulting from the precipitation of alumina from the alumina-rich solution is returned to the digestion step and there used as caustic liquor.

4. A cyclic method of extracting silica-free alumina from bauxite including as a first step pressure digestion of the bauxite with caustic liquor to form an alumina-rich solution of low silica content and an insoluble residue of high silica content containing substantial quantities of insolubilized alumina and caustic values, separation of the residue from the solution, precipitation of alumina from the solution and separation of the alumina from the resultant mother liquor, and including as a second step the sintering of the residue of the first step with alkaline earth compound and alkali metal compound in proportions adapted to insolubilize silica as alkaline earth silicate and to solubilize alumina as alkali metal aluminate, leaching the resultant sinter to remove the soluble alumina values from the insolubilized silica, thereby producing leach liquor containing alkali metal aluminate and residual amounts of soluble silica and including as a third step the return of mother liquor from the first step and leach liquor from the second step to form the caustic liquor of the pressure digestion of the first step and repeating the process.

RALPH WALDO BROWN.